March 12, 1963 W. R. WHITNEY, JR 3,080,910
HOT GAS THERMOPLASTIC WELDING APPARATUS
Filed April 25, 1960 3 Sheets-Sheet 3

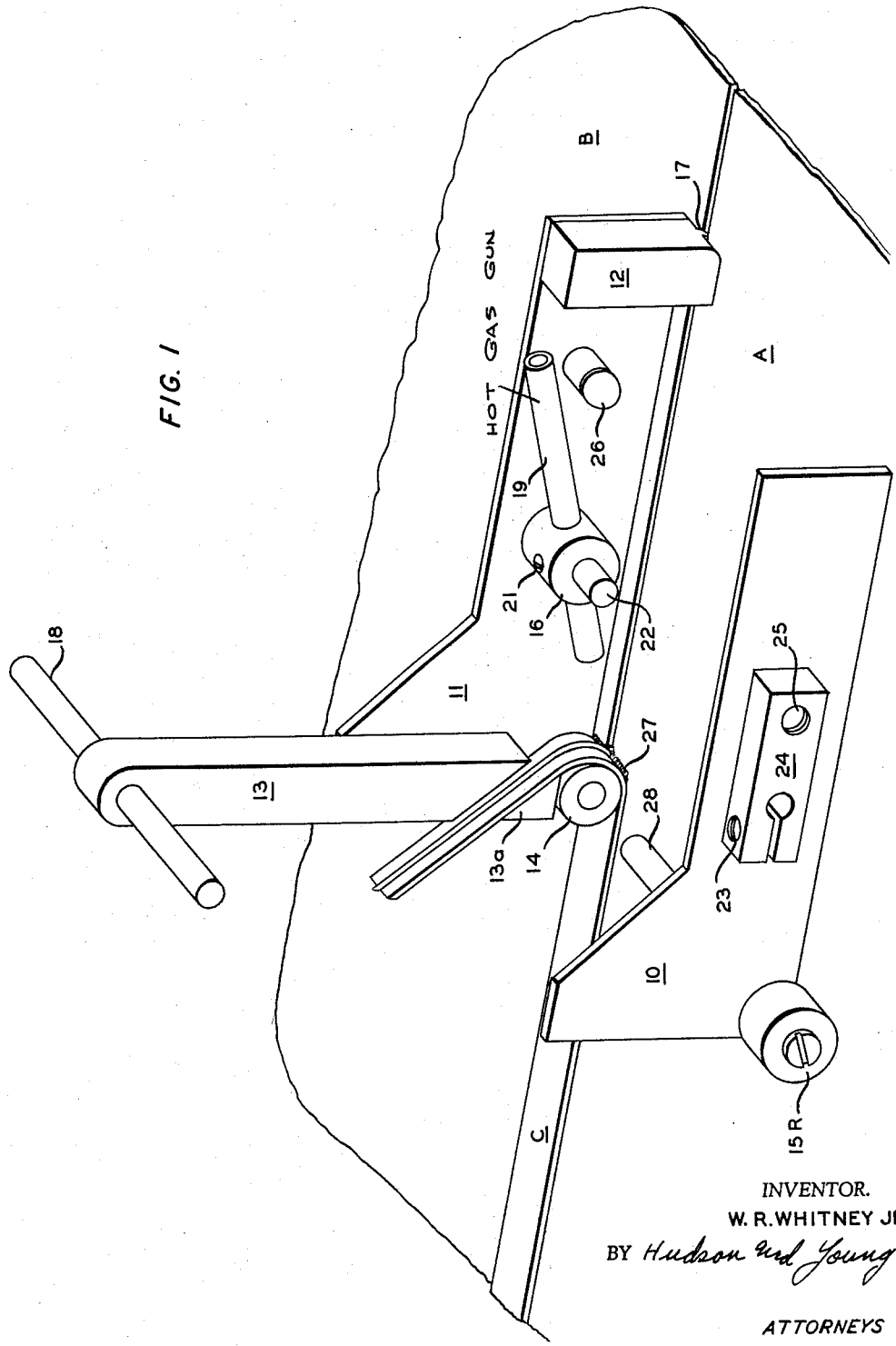

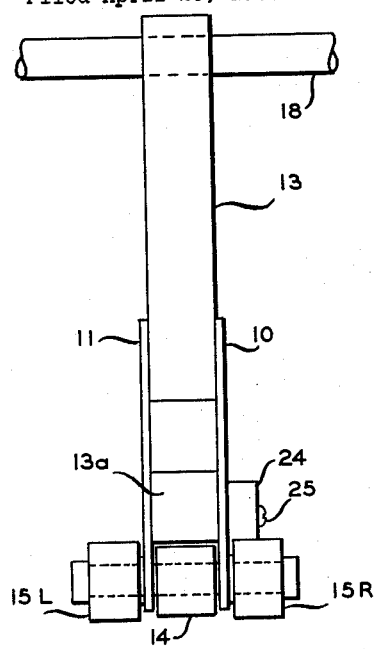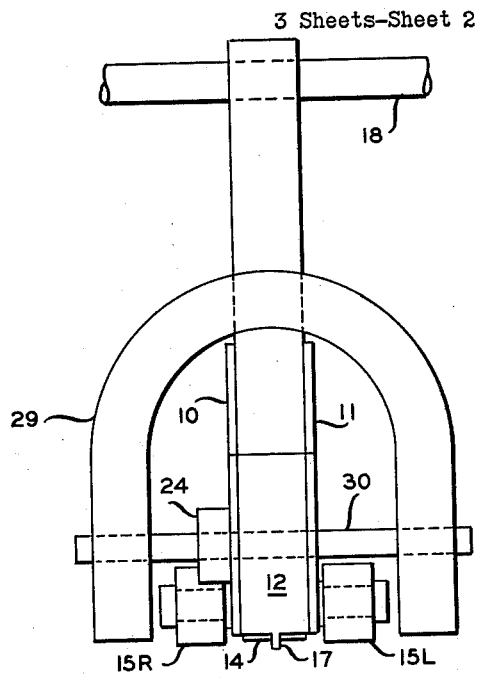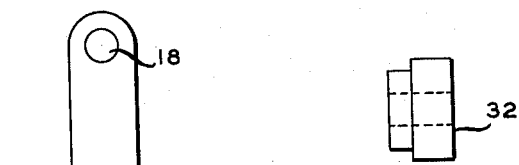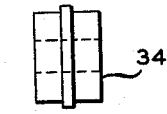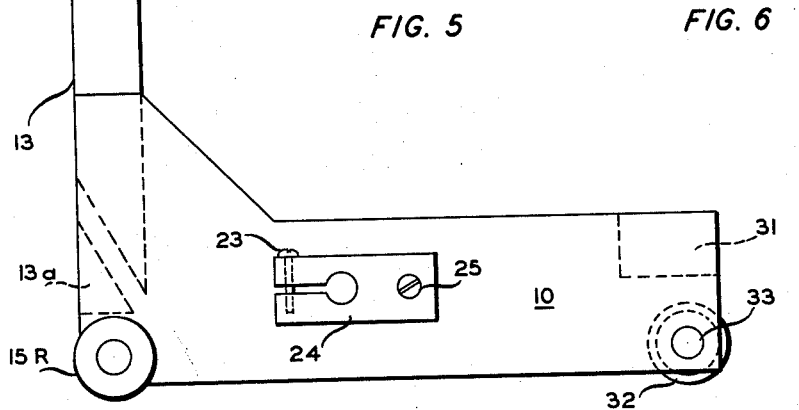

INVENTOR.
W. R. WHITNEY JR.
BY Hudson and Young

ATTORNEYS

United States Patent Office 3,080,910
Patented Mar. 12, 1963

3,080,910
HOT GAS THERMOPLASTIC WELDING
APPARATUS
William R. Whitney, Jr., Bartlesville, Okla., assignor to Phillips Petroleum Company, a corporation of Delaware
Filed Apr. 25, 1960, Ser. No. 24,506
6 Claims. (Cl. 156—497)

This invention relates to a method for effecting welded joints in sheets of thermoplastic material and a device to accomplish the welding operation. In one aspect the invention relates to a strip feeder for applying a strip of thermoplastic material to the junction of two sheets of thermoplastic material which are to be welded together whereby a predetermined amount of pressure is applied to the strip as it is joined to the junction of the two sheets.

It is a principal object of this invention to provide a device for fusing plastic sheets together so that a uniform fusion of the materials is obtained. Another object of this invention is the provision of a device for fusing sheets of thermoplastic materials together rapidly and with a minimum requirement of skill on the part of the operator. Still another object of the invention is the provision of a method for accomplishing the fusion of thermoplastic sheets rapidly and uniformly. Other objects and advantages will become apparent to one skilled in the art upon studying this disclosure including a detailed description of the invention and the attached drawing wherein:

FIGURE 1 is a perspective view of one embodiment of the strip feeder of the invention shown partially assembled;

FIGURE 2 is an elevation of one end of the device;

FIGURE 3 is an elevation of the other end of the device and having a magnet attached thereto;

FIGURE 4 is a side elevation of one modification of the device of the invention;

FIGURE 5 is a view of a guide wheel for use in making a lap joint;

FIGURE 6 is a view of a guide wheel for use in making a butt joint;

Figure 7:
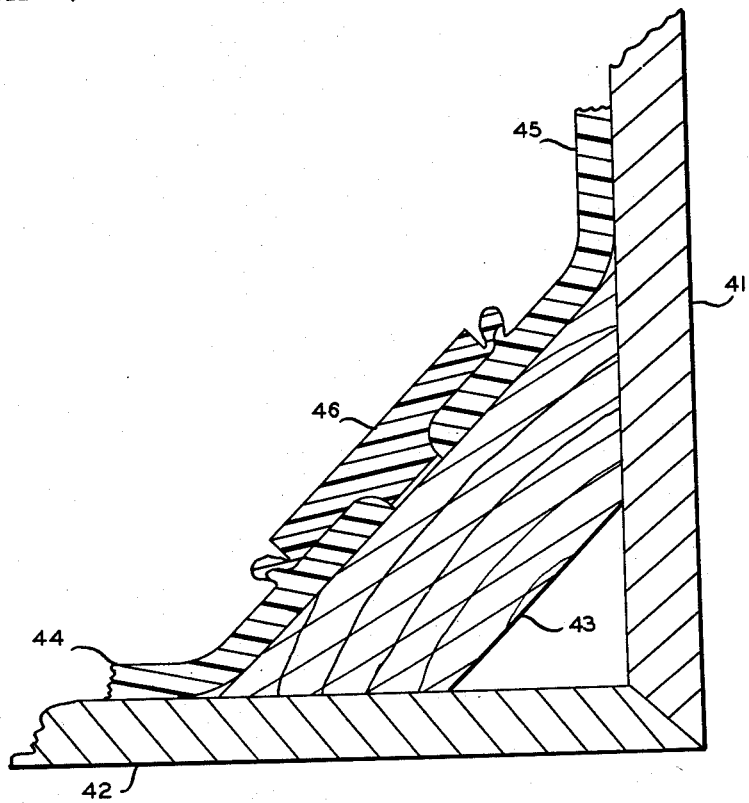
FIGURE 7 is a sectional view of a corner weld made with a butt joint.

Referring now to FIGURE 1, the device is comprised of two side plates 10 and 11, a front spacer 12, a rear spacer 13, a strip roller 14, a right wheel 15R, a left wheel 15L (not shown), and a hot gas gun holder 16. The wheels 15R and 15L and the strip roller 14 are carried on a common axle 28. The front end spacer 12 carries on its bottom edge a guide tip 17, also shown in FIGURE 3, which acts as a spacer for the sheets to be welded together and as a guide for the strip feeder. As illustrated, the device is being used to fuse together plastic sheets A and B, utilizing the ribbed plastic strip C to provide the thermoplastic material for the fusion. The handle 18, secured to rear spacer 13, is used for propelling the device and for applying pressure to the thermoplastic strip C when the device is operated manually. The wheels 15R and 15L are of larger diameter than is the roller 14 so that when pressure is applied to the handle 18 the wheels 15R and 15L support the excess weight over that desired to be applied to the strip C. The diameter of wheels 15R and 15L will be determined by the thickness of the thermoplastic strip illustrated at C.

The hot gas gun tip 19 is longitudinally adjustable in the hot gas gun tip holder 16 and is secured in position by set screw 21. The angle of the gun tip with respect to the plastic sheets A and B is adjusted by rotating the holder 16 on its axle 22. The axle 22 is secured in position by set screw 23 in tip holder anchor 24. Tip holder anchor 24 can be secured to side plate 10 by welding or by means of the set screw 25, as illustrated. A light 26 is shown secured to side plate 11 and can be connected to an electrical source (not shown) such as a battery or a generator.

The rear spacer 13 is shown composed of two elements 13 and 13a so that the space between these two elements provides a guide for passing the thermoplastic strip C into the strip feeder.

In accomplishing the fusion of two thermoplastic sheets such as sheet A and sheet B, the strip feeder is propelled along the junction of the two sheets at a rate sufficient to maintain the size of the molten roll 27 within predetermined limits.

FIGURE 2 shows the difference in the diameter of the wheels 15R and 15L and that of strip roller 14.

FIGURE 3 shows the guide tip 17 in relation to the wheels 15R and 15L and also shows a magnet 29 attached to the device to apply pressure to the strip roller 14 when the sheets of thermoplastic to be joined are placed upon a magnetic metal surface.

A preferred modification of the device is shown in FIGURE 4 wherein a front spacer 31 is utilized and a guide roller 32 is utilized in place of the guide tip 17. The guide roller is secured to the side plates 10 and 11 by an axle 33 similar to the axle 28. A guide roller 32 for making a lap joint is shown in FIGURE 5 and a guide roller 34 for making a butt joint is shown in FIGURE 6.

Figure 8:
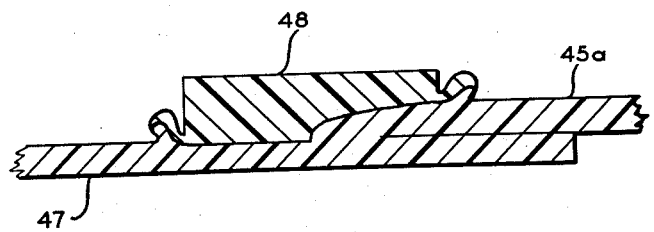
FIGURE 8 is a sectional view of a weld made with a lap joint.

FIGURE 7 illustrates a method for making a corner joint in a thermoplastic liner for a structure indicated as a steel tank having a side 41 and a bottom 42. A wooden block 43 is fitted into the corner and can be secured by any desired means such as cementing or bolting to the side and bottom of the tank. A bottom sheet of thermoplastic liner 44 and a side sheet of thermoplastic liner 45 are joined together with a ridged thermoplastic strip 46 in a welding operation such as that illustrated in FIGURE 1. If the space between the bottom liner 44 and the side liner 45 is too great for utilizing the butt joint technique, a lap joint can be utilized, as shown in FIGURE 8, by placing a sheet 47 of thermoplastic beneath the edges of the sheets 44 and 45 and making a lap joint at each of the edges, as indicated in FIGURE 8, utilizing a lap strip of thermoplastic 48.

When using the device of this invention for butt welding thermoplastic sheets, the sheets are aligned for welding with a uniform space between the sheets corresponding approximately to the width of the rib on the T-shaped butt fusing strip and secured in position. A starting tab of the same thickness as that of the sheets to be welded, for example, a scrap of the same thermoplastic sheet, is placed at the beginning of the seam and secured in position as with masking tape or other pressure-sensitive tape. It is advisable to use a starting tab because when the fusing strip and strip feeder are lowered into fusing position it takes a few seconds for the strip to become attached to the sheets and it is possible during this short period for the strip or the sheets to become overheated. If a starting tab is employed, any overheating or underheating as a result of starting the operation will occur on this starting tab.

The fusing strip is inserted in the strip feed slot and bent under the center roller as the feeder is lowered into starting position on the tab. In this position the rib on the guide wheel or guide tip will run in the space between the sheets. The strip feeder is moved slowly along the joint at a speed of, for example, 6 inches per minute and with pressure exerted to press the device against the thermoplastic sheets of about 10 pounds when sheets of 60 mil thickness are being joined. The operator governs the speed of travel by watching the molten roll that shows inside the strip feeder when the fusing strip meets the joint being fused. This roll should be approximately 1/16 of an inch in diameter.

The welding operation is terminated by lifting the feeder from the joint and removing the remaining fusing strip from the strip feeder.

Some of the advantages of utilizing the strip feeder of this invention over the welding of thermoplastic by hand and over using the devices of the prior art include the following: The pressure exerted upon the fusing strip is predetermined and constant so that a definite amount of the strip is forced into the space between the adjacent sheets of thermoplastic. This is accomplished by the difference in the supporting wheel radius and the roller radius. This difference for a 60-mil strip is 40 mils, i.e., 20 mils from the surface of the parent sheet, and the bottom of the strip is forced either into the space between the sheets to be joined or out from under the strip on either side. The pressure to cause this molten material to flow is applied manually to the handle of the strip feeder by the operator, by weights placed upon the strip feeder, or by magnets attached to the strip feeder as illustrated in FIGURE 3.

The heat source, which is usually a hot gas gun, is secured to the strip feeder and, once aligned and regulated to provide the proper amount of heat to the proper spot for optimum welding, maintains its relationship to the welding operation so long as the strip feeder is being used. The side plates in the strip feeder shelter the hot gases from air currents and maintain control of heat distribution at the weld.

The guide wheel or guide tip determines the centering of the strip as the feeder is moved along the thermoplastic sheets to be joined.

For welding thermoplastic sheets 60 mils in thickness, the difference in the radius of the supporting wheels and that of the roller is about 40 mils; for sheets 30 mils in thickness, the radius difference is about 22 mils; and for thermoplastic sheets 125 mils in thickness, the radius difference will be about 80 mils.

The strip feeder of this invention has produced superior welds, both butt welds and lap welds, with a savings in time, materials, and labor as compared to welding thermoplastic sheets by hand or with devices of the prior art.

Reasonable variations and modifications are possible within the scope of this disclosure without departing from the spirit and scope of the invention.

That which is claimed is:

1. A plastic welding device for welding together the junction of two sheets of plastic comprising, in combination, a pair of spaced parallel plates; a spacer at each end of said pair of plates; an opening in a first of said spacers to admit a plastic welding strip between said plates; a roller positioned between said plates adjacent said first spacer and supported upon a shaft passing transversely through said plates; a pair of wheels supported upon said shaft externally of said plates, the radii of said wheels being greater than the radius of said roller by the amount of welding strip to be retained on top of two adjacent sheets of plastic being welded together; a hot gas nozzle positioned between said plates intermediate said spacers; means to adjust the direction of flow of hot gas; a light positioned between said plates intermediate said spacers; a guide means secured between said plates adjacent the second of said spacers to guide the device along the junction of the two sheets of plastic; and means to press the device to said sheets of plastic.

2. The device of claim 1 wherein the means for pressing the device to the plastic sheets is a handle for manually applying pressure.

3. The device of claim 1 wherein the means for pressing the device to the plastic sheets is a magnet for use when the sheets are placed upon a magnetic metal support.

4. A plastic welding device comprising, in combination, a housing containing therein means to feed a plastic welding strip to the junction of two sheets of plastic to be welded; a hot gas nozzle connected to a supply of hot gas and positioned in said housing so as to direct a flow of hot gas to the junction of said two sheets of plastic and said plastic strip; means to adjust the position of said nozzle with respect to said strip; a roller positioned in said housing so as to press the plastic welding strip into the junction of the two sheets of plastic; wheel means positioned to bear on said plastic sheets so as to support said housing and said roller and thereby to limit the pressure applied to said strip; and means to guide the device along the junction of the two plastic sheets comprising a runner secured to the front end of the device and adapted to travel between the adjacent edges of the plastic sheets to be joined.

5. A plastic welding device comprising, in combination, a housing containing therein means to feed a plastic welding strip to the junction of two sheets of plastic to be welded; a hot gas nozzle connected to a supply of hot gas and positioned in said housing so as to direct a flow of hot gas to the junction of said two sheets of plastic and said plastic strip; means to adjust the position of said nozzle with respect to said strip; a roller positioned in said housing so as to press the plastic welding strip into the junction of the two sheets of plastic; wheel means positioned to bear on said plastic sheets so as to support said housing and said roller and thereby to limit the pressure applied to said strip; and means to guide the device along the junction of the two plastic sheets comprising a wheel having a raised center and secured to the front of the device so as to travel with the raised portion between the adjacent edges of the plastic sheets to be joined.

6. A plastic welding device comprising, in combination, a housing containing therein means to feed a plastic welding strip to the junction of two sheets of plastic to be welded; a hot gas nozzle connected to a supply of hot gas and positioned in said housing so as to direct a flow of hot gas to the junction of said two sheets of plastic and said plastic strip; means to adjust the position of said nozzle with respect to said strip; a roller positioned in said housing so as to press the plastic welding strip into the junction of the two sheets of plastic; wheel means positioned to bear on said plastic sheets so as to support said housing and said roller and thereby to limit the pressure applied to said strip; and means to guide the device along the junction of the two plastic sheets comprising a wheel having one raised edge and secured to the front of the device so as to travel along the edge of two lapped sheets of plastic to be joined.

References Cited in the file of this patent

UNITED STATES PATENTS

| | | |
|---|---|---|
| 2,157,732 | Piazze | May 9, 1939 |
| 2,372,737 | Phillips | Apr. 3, 1945 |
| 2,713,379 | Sisson | July 19, 1955 |
| 2,722,964 | Duncan | Nov. 8, 1955 |
| 2,799,610 | Magill | July 16, 1957 |

FOREIGN PATENTS

| | | |
|---|---|---|
| 560,833 | Italy | Apr. 12, 1957 |